United States Patent [19]

Iga et al.

[11] Patent Number: 4,491,943

[45] Date of Patent: Jan. 1, 1985

[54] METHOD FOR TRANSMITTING TIME-SHARING MULTIDATA

[75] Inventors: Akira Iga; Kentaro Odaka, both of Kawasaki; Nobuyuki Yasuda, Chiba, all of Japan

[73] Assignee: Sony Corporation, Tokyo, Japan

[21] Appl. No.: 347,554

[22] Filed: Feb. 10, 1982

[30] Foreign Application Priority Data

Feb. 17, 1981 [JP] Japan .................................. 56-22000

[51] Int. Cl.³ .............................................. H04J 3/14
[52] U.S. Cl. ........................................ 370/13; 371/40
[58] Field of Search ....................... 370/13, 99; 371/40

[56] References Cited

U.S. PATENT DOCUMENTS

| | | | |
|---|---|---|---|
| 3,622,984 | 11/1971 | Eastman .................................. | 371/40 |
| 4,161,719 | 7/1979 | Parikh et al. .......................... | 370/13 |
| 4,211,997 | 7/1980 | Rudnick et al. ........................ | 371/40 |
| 4,229,816 | 10/1980 | Breidenstein et al. ................. | 380/13 |
| 4,276,646 | 6/1981 | Haggard et al. ....................... | 371/40 |
| 4,306,305 | 12/1981 | Doi et al. .............................. | 371/40 |
| 4,310,921 | 1/1982 | Rosa ...................................... | 370/13 |
| 4,345,324 | 8/1982 | Smitt ..................................... | 370/13 |
| 4,429,390 | 1/1984 | Sonoda et al. ......................... | 371/40 |
| 4,441,184 | 4/1984 | Sonoda et al. ......................... | 371/40 |

FOREIGN PATENT DOCUMENTS 1578469 11/1980 United Kingdom .

OTHER PUBLICATIONS

Nachrichten Elektronik, vol. 34, No. 12, Dec. 1980, pp. 422-424, Heidelberg (DE).
Fujitsu, vol. 15, No. 14, Dec. 1979, pp. 1-19, Tokyo, T. Moriya et al., "Digital Transmission System for Stereo Broadcasting".
Journal of Audio Engineering Society, vol. 28, No. 4, Apr. 1980, pp. 225-236, New York.
IEEE Transactions on Computers, vol. C17, No. 10, Oct. 1968, pp. 935-943, New York.

*Primary Examiner*—Douglas W. Olms
*Assistant Examiner*—Wellington Chin
*Attorney, Agent, or Firm*—Lewis H. Eslinger; Alvin Sinderbrand

[57] ABSTRACT

A method for transmitting time-sharing multidata in which data series of a plurality of channels are time-sharing multiplexed to form a transmitting data series having the steps of adding error detecting or error correcting redundant bits and synchronizing redundant bits to predetermined number of information bits contained in the respective data series of the channels to form one transmitting unit, forming bit groups in a manner as to take each bit corresponding to each other between the channels as one group with respect to the information bits, the error detecting or error correcting redundant bits and the synchronizing redundant bits of said one transmitting unit of each of the channels, time-sharing multiplexing the data series so as to form one frame in which these bit groups are sequentially continued to each other and using the synchronizing redundant bits as a frame synchronizing signal of the transmitting data series.

9 Claims, 17 Drawing Figures

FIG. 6
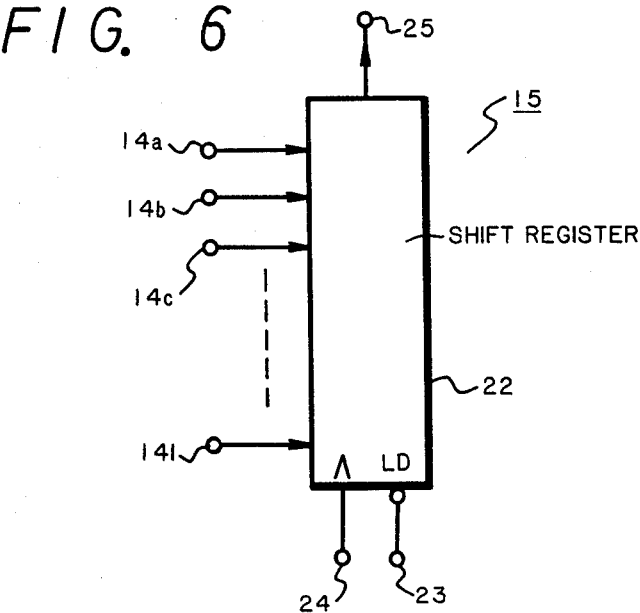
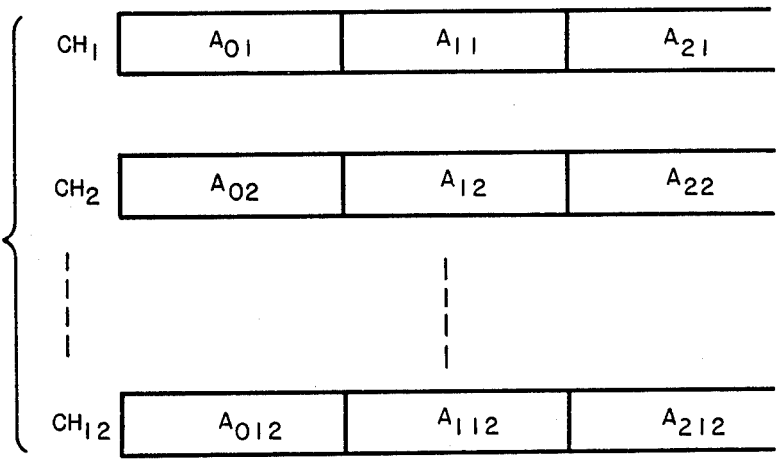
FIG. 7A
FIG. 7B
FIG. 7C (CK)
FIG. 7D
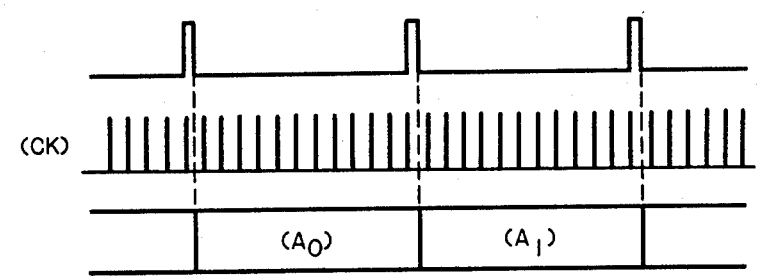

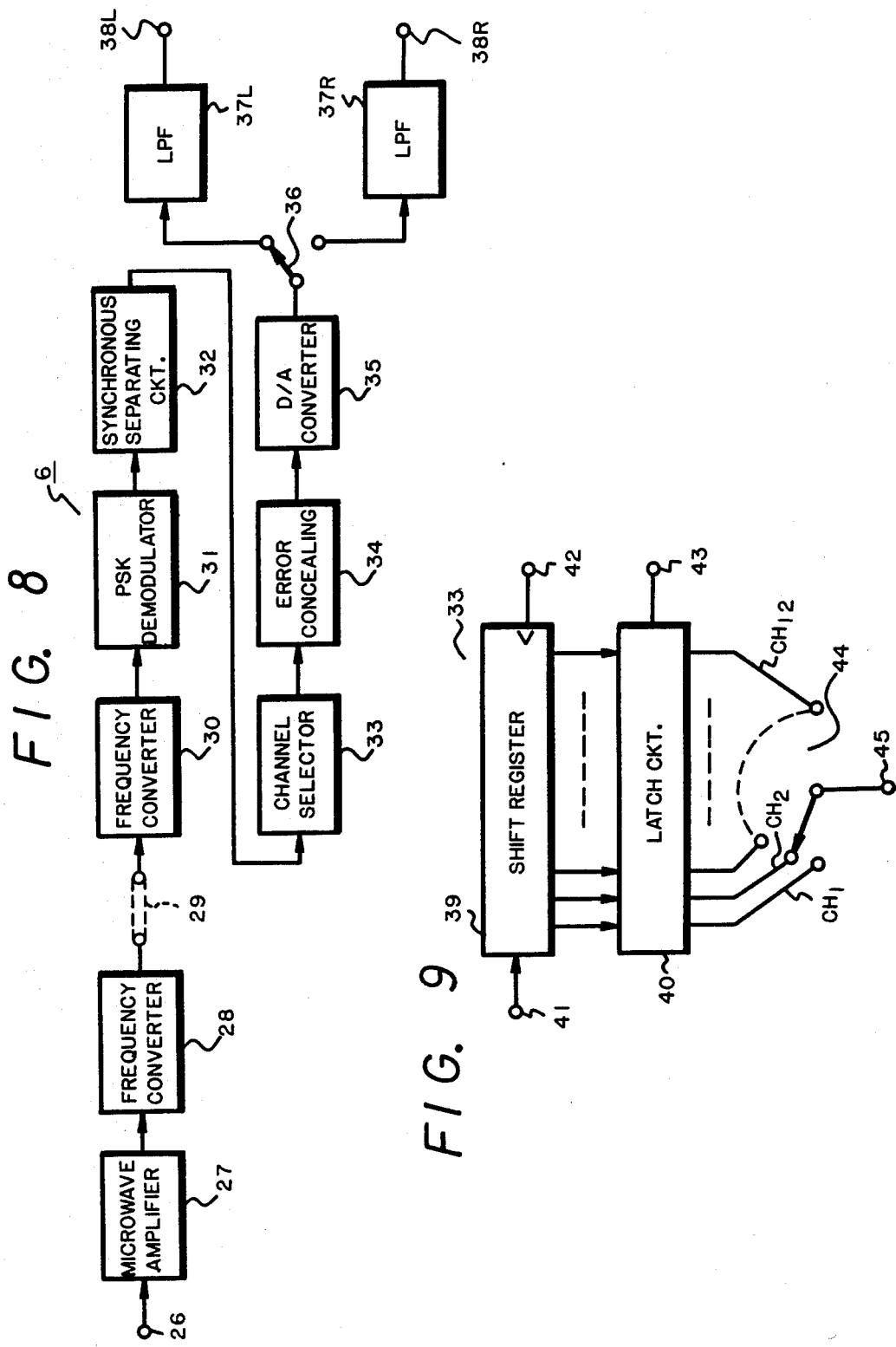

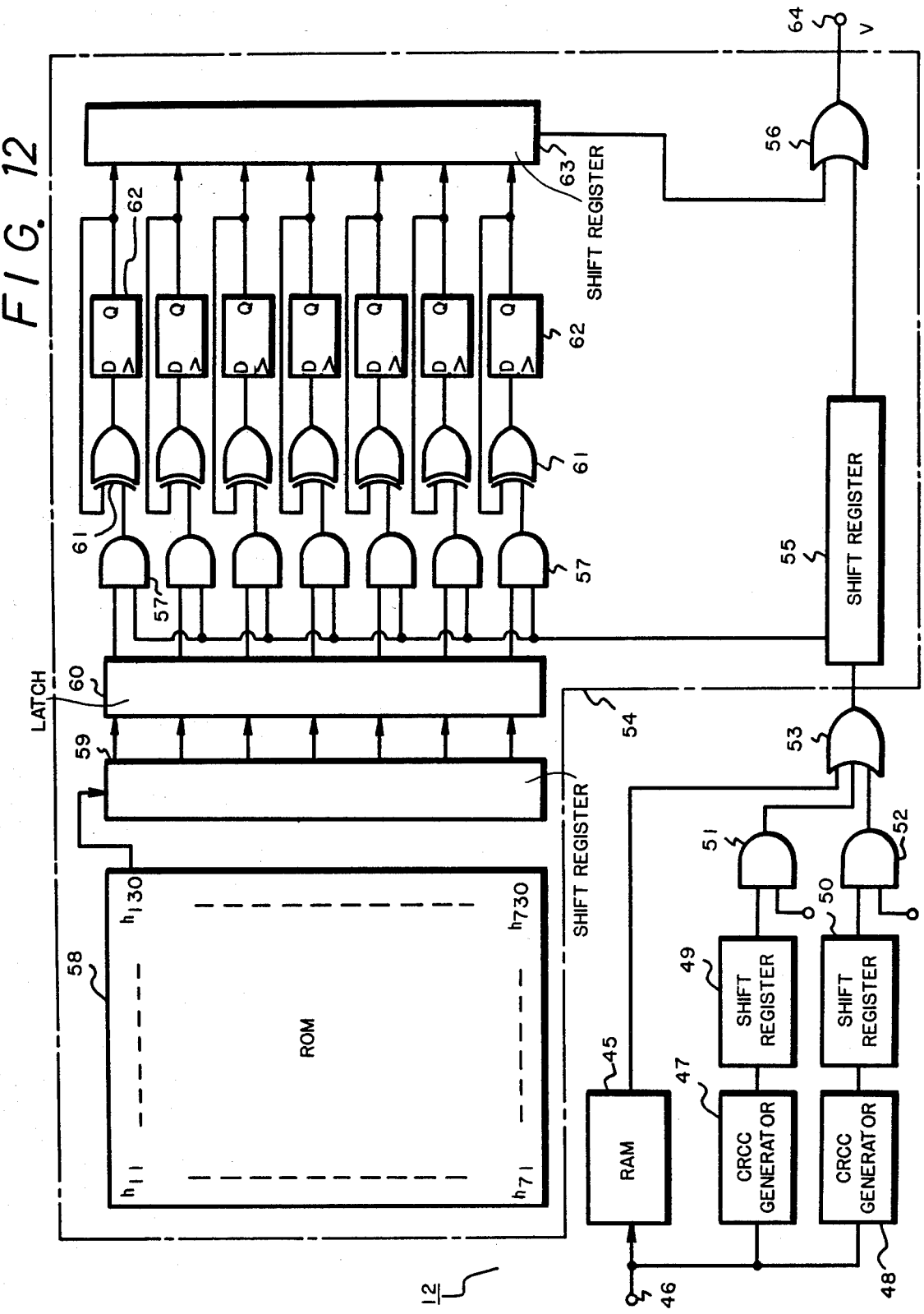
F I G. 12

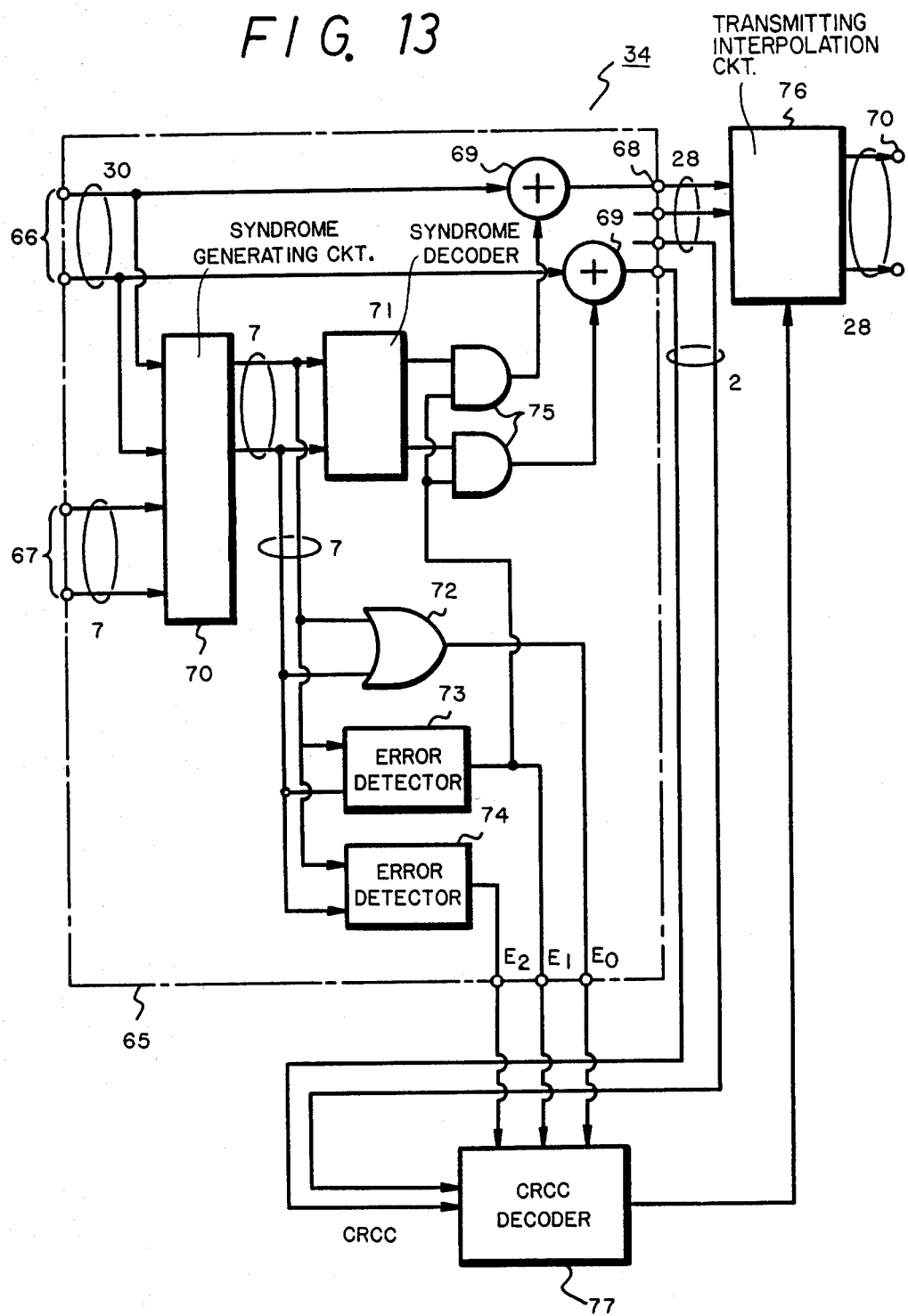

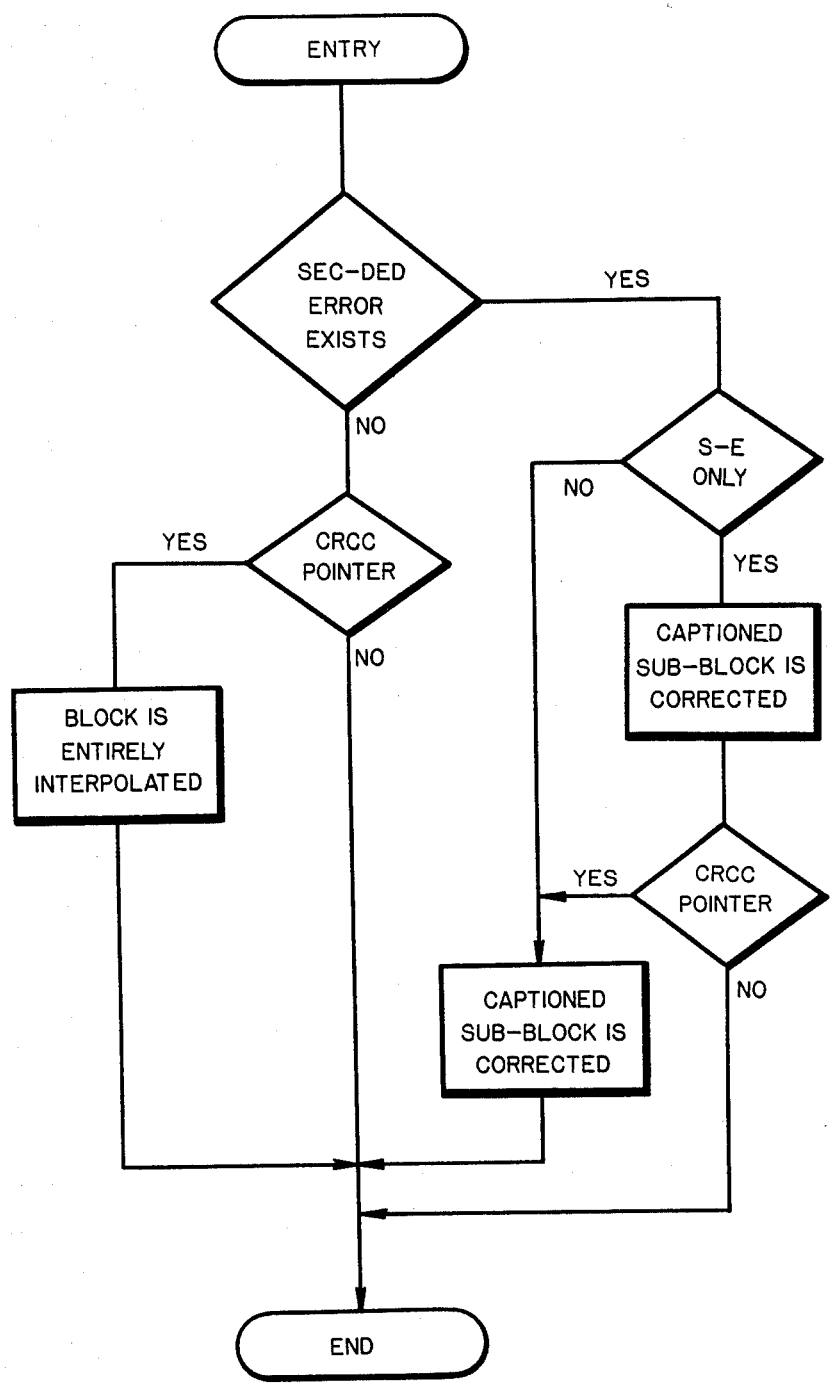

METHOD FOR TRANSMITTING TIME-SHARING MULTIDATA

BACKGROUND OF THE INVENTION

1. Field of the Invention

The present invention relates generally to a method for transmitting time-sharing multidata and is directed more particularly to a method for transmitting time-sharing multidata suitable for use in satellite broadcasting.

2. Description of the Prior Art

In accordance with satellite broadcasting, an electrical wave is transmitted from a broadcasting station on the earth to an artificial satellite in which it is received, amplified and frequency-converted and subsequently transmitted to a listener or receiver on the earth again. Today, one television or audio broadcast can be made in association with the satellite broadcasting. The audio broadcasting requires a band width narrower than that of the television broadcasting. If one broadcasting channel assigned to the television broadcasting is used for the audio broadcasting, it can handle a number of multiplexed audio channels. In this case, a time-sharing multiplex can be utilized. More particularly, an information digital signal achieved by PCM (Pulse Code Modulation)-modulating an audio signal is time-sharing multiplexed in order to perform the audio broadcasting with high quality.

As a method for time-sharing multiplexing a plurality of data, one method is proposed in which a predetermined time is divided by the number of the channels, time positions are assigned to the corresponding divided channels each and data from the respective channels are time-base compressed and inserted in the appropriate time positions thereby permitting a redundant code for detecting an error or for correcting the error and a redundant code for synchronization to be added to the multiplexed data. This time-sharing multiplexing method is used when a plurality of the broadcasting stations on the earth perform both the transmitting and receiving of the radio waves. But, in the case where the transmitting side and the receiving side are distinguished obviously from each other like in satellite broadcasting, the time-sharing multiplexing method as set forth above will not be suitable for the satellite broadcasting in view of the fact that the apparatus owned by the listener becomes complicated in construction.

OBJECTS AND SUMMARY OF THE INVENTION

Therefore, an object of the present invention is to provide a novel method for transmitting time-sharing multidata which can solve the afore-described problems.

Especially, another object of the present invention is to provide a method for transmitting time-sharing multidata wherein upon receiving a transmitted data series, it is sufficient to use a receiving apparatus or receiver which can be actuated by a clock with low frequency.

Further, another object of the present invention is to provide a method for transmitting time-sharing multidata which can error-correct the received data of the desired channel using a bit rate substantially lower than that upon transmitting.

Still further, another object of the present invention is to provide a method for transmitting time-sharing multidata which can produce a receiving apparatus or receiver for receiving a transmitted data series at a low cost.

Still further, another object of the present invention is to provide a method for transmitting time-sharing multidata in which even when a bit number of the redundant bits for synchronization is less, it is possible to secure the bit number necessary for a frame synchronizing signal.

Still further, another object of the present invention is to provide a method for transmitting time-sharing multidata which is free from a problem of a transmission of an error when input noises exceeding an error correction capability are caused and which is effective for use in the PCM broadcasting in high quality.

Still further, another object of the present invention is to provide a method for transmitting time-sharing multidata which can reduce both error-correction ratio and interpolation error particularly when the redundancy of the error correction code is small.

According to an aspect of the present invention, there is provided a method for transmitting time-sharing multidata in which data series of a plurality of channels are time-sharing multiplexed to form a transmitting data series having the steps of adding a group of error detecting or error correcting redundant bits and a group of synchronizing redundant bits group of information bits contained in the respective data series of said channels to form one transmitting unit, forming one frame in which these bit groups in a manner as to take each bit corresponding to each other between the channels with respect to the information bit, the error detecting or error correcting redundant bits and the synchronizing redundant bits of said one transmitting unit of each of said channels, time-sharing multiplexing the data series so as to form one frame in which these bit groups are sequentially continued to each other and transmitting the time-sharing multiplexed data together with a frame synchronizing signal.

The other objects, features and advantages of the present invention will become apparent from the following description taken in conjunction with the accompanying drawings through which the like references designate the same elements and parts.

BRIEF DESCRIPTION OF THE DRAWINGS

FIG. 6 is a block diagram showing one example of a multiplexer for use in time-sharing multiplexing data;

FIGS. 7A through 7D are respectively timing charts used to explain the operations of the multiplexer in FIG. 6;

FIG. 8 is a block diagram schematically showing a construction of one embodiment of the present invention provided at a receiving side;

FIG. 9 is a schematic block diagram of one example of a channel selector;

FIG. 12 is a block diagram schematically showing an encoder which generates the error correction block seen in FIG. 11;

FIG. 13 is a block diagram schematically showing a decoder corresponding to the encoder in FIG. 12; and FIG. 14 is a diagram partially showing a flow chart of the decoder in FIG. 13.

DESCRIPTION OF THE PREFERRED EMBODIMENTS

One embodiment of the present invention applied to a satellite broadcasting will be described hereinafter.

Figure 1:
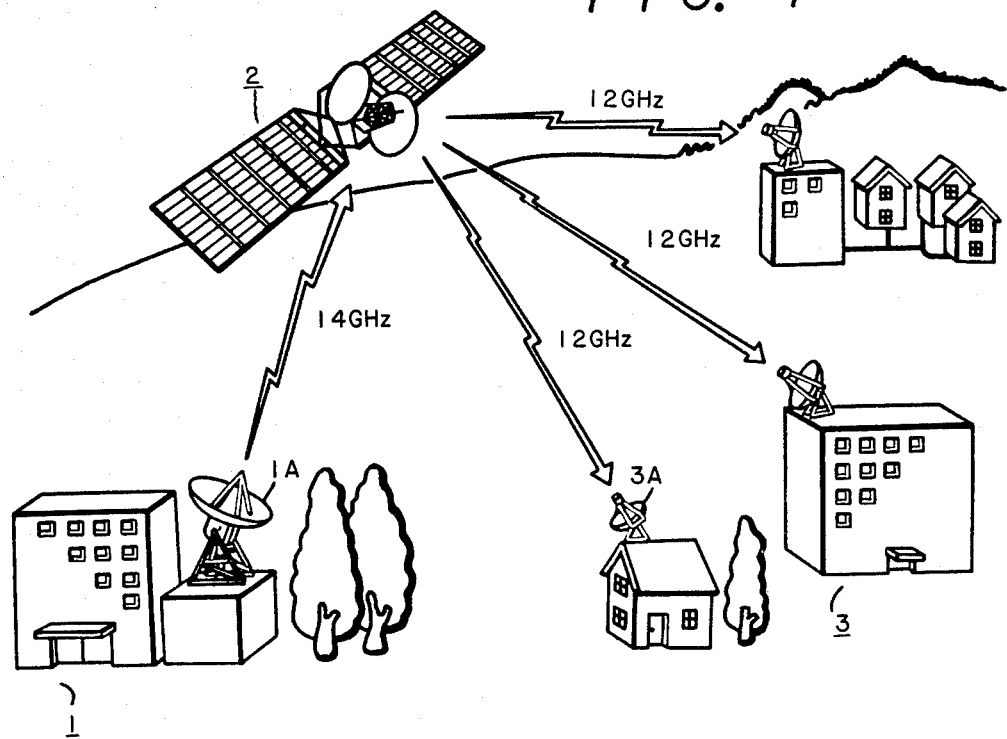
FIG. 1 is a schematic diagram showing a satellite broadcasting system to which the present invention can be applied.

As shown in FIG. 1, in a broadcasting station 1 on the earth, a channel for transmitting a television signal and a channel for transmitting an audio signal are modulated by a single carrier wave and then transmitted as a microwave of, for example, about 14 $GH_Z$ through a transmitting antenna 1A. This micro wave is received by a geostationary satellite 2 and after being amplified, it is frequency-converted to a micro wave with a frequency of, for example, about 12 $GH_Z$ and transmitted again to the earth.

Figure 2:
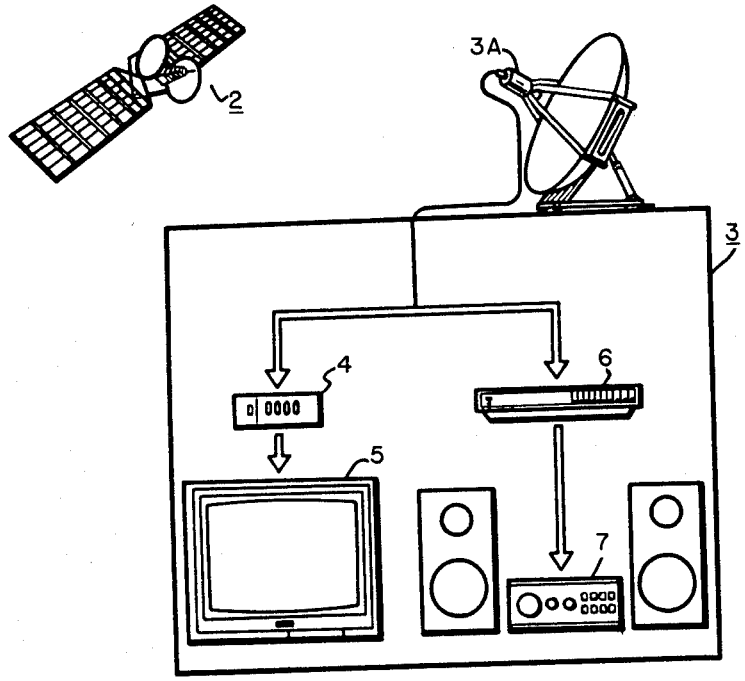
FIG. 2 is a schematic diagram showing a receiving system of a satellite broadcasting system shown in FIG. 1, particularly a receiving system installed within a general listener's home.

As shown in FIG. 2, in a receiving station 3 on the earth, the micro wave received by an antenna 3A is demodulated by a TV (television) tuner 4 so as to be reproduced by a television receiver 5. At the same time, the audio signal is demodulated by a program selector 6 and then reproduced by, for example, a Hi-Fi (high fidelity) apparatus 7. The audio signal transmitted from the broadcasting station 1 is such signal that stereophonic audio data of twelve transmitting channels are time-sharing multiplexed.

Figure 3:
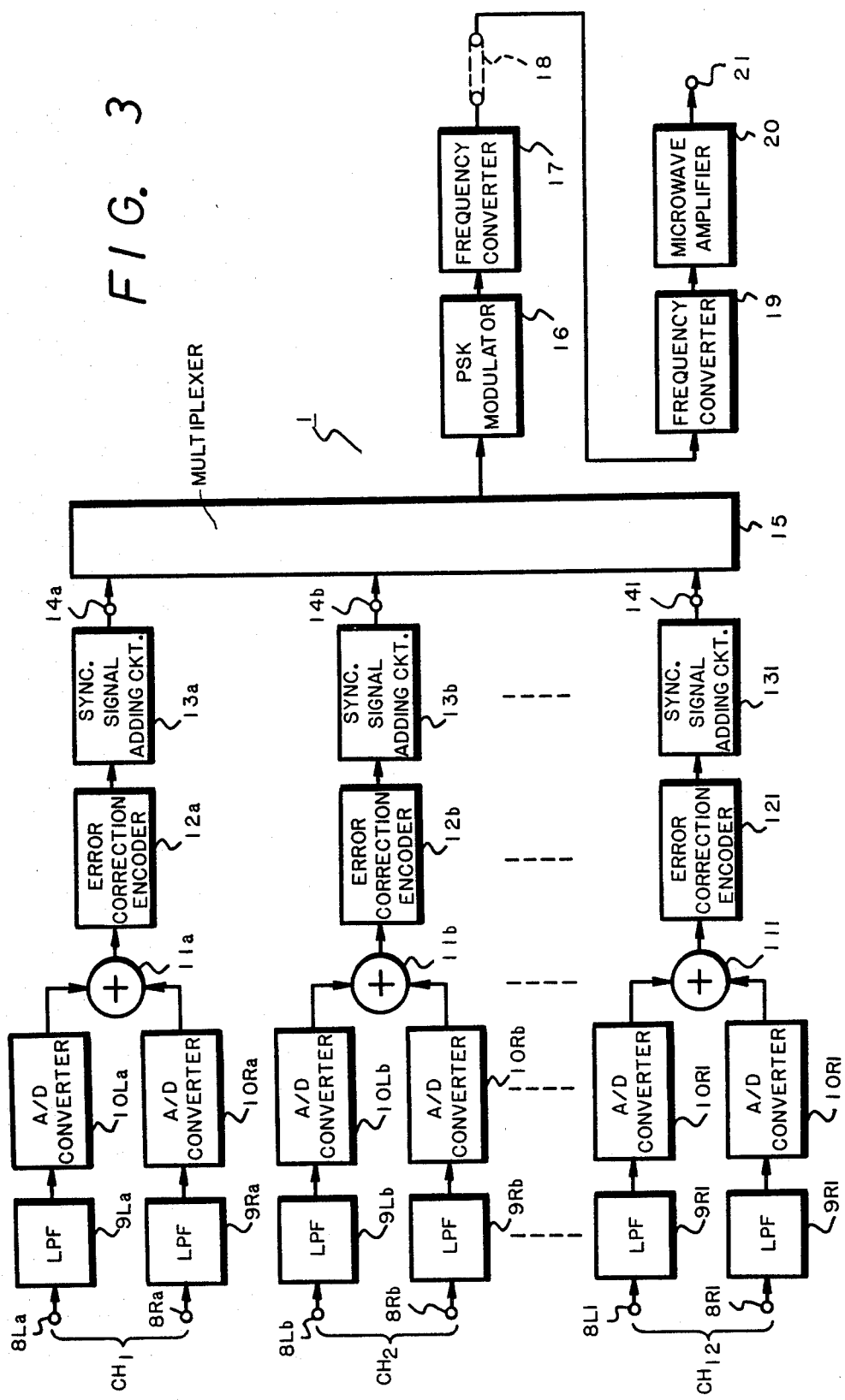
FIG. 3 is a schematic block diagram showing one embodiment of the present invention provided at a transmitting side.

FIG. 3 shows an arrangement of the broadcasting station, namely, the transmitting side in which right and left stereophonic audio signals each of the broadcasting channels of first to twelfth channels (hereinafter, simply referred to as CH1 to CH12) are respectively supplied to input terminals $8L_a$, $8R_a$, $8L_b$, $8R_b$ ... $8L_l$, $8R_l$. These right and left stereophonic audio signals are fed channel by channel through low pass filters $9L_a$, $9R_a$, $9L_b$, $9R_b$ ... $9L_l$, $9R_l$ to analog-to-digital (A/D) converters $10L_a$, $10R_a$, $10L_b$, $10R_b$ ... $10L_l$, $10R_l$ whereby they are PCM-modulated so as to make data of, for example, 14 bits per one sample and then fed to each channel to adders $11a$, $11b$, ... $11l$. Accordingly, at the outputs of the adders $11a$, $11b$, ... $11l$ are produced PCM data series in which PCM data of the right and left channels are placed alternately.

These PCM data series are respectively supplied to error correction encoders $12_a$, $12_b$, ... $12_l$ whereby they are encoded for error-correction in each channel. Block codes are used as the error correction codes, in which for example, a BCH code and a parity code are combined as will be described later. The respective output data series from the error-correction encoders $12_a$, $12_b$ ... $12_l$ are fed to synchronizing signal adding circuits $13_a$, $13_b$ ... $13_l$ thereby added with block synchronizing signals.

In this way, the signals to which error-correcting redundant bits and synchronizing redundant bits have been added at every channel of CH1 to CH12 appear at intermediate output terminals $14_a$, $14_b$ ... $14_l$. These signals appearing thereat are supplied to a multiplexer 15 whereby they are time-sharing multiplexed.

Figure 4:
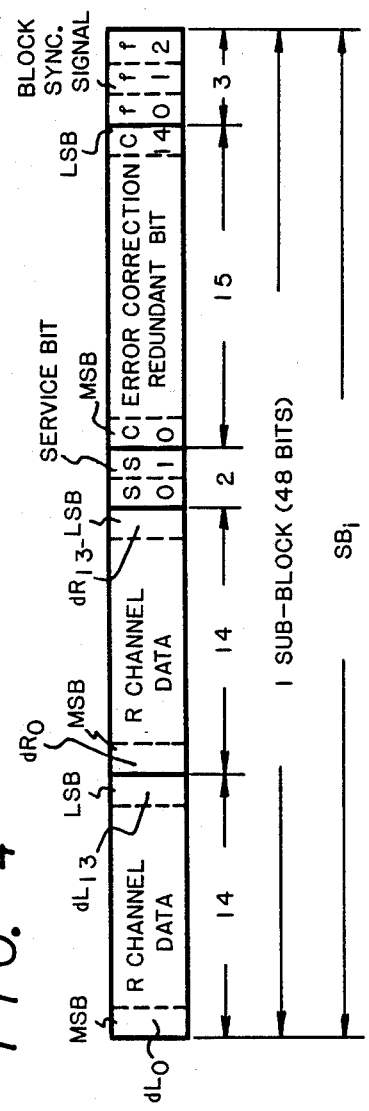
FIGS. 4 and 5 are schematic diagrams showing data formats of one embodiment according to the present invention.

FIG. 4 illustrates a data format of a subblock $SB_i$ common to the respective channels of the signals appearing at the respective intermediate output terminals $14_a$, $14_b$ ... $14_l$ so as to be supplied to the multiplexer 15. One subblock $SB_i$ is formed of total 48 bits made up of data bits $dL_0$ to $dL_{13}$ comprising 14 bits for the left channel, data bits $dR_0$ to $dR_{13}$ comprising 14 bits for the right channel, service bits $s_0$ and $s_1$ comprising 2 bits, error-correcting redundant bits $c_0$ to $c_{14}$ comprising 15 bits and synchronizing redundant bits $f_0$, $f_1$ and $f_2$ comprising 3 bits. The service bits that can be $s_0$ and $s_1$ are spare bits utilized to add necessary information in case of identification or discrimination and control and so forth. The right and left audio data $dL_0$ to $dL_{13}$ and $dR_0$ to $dR_{13}$ are so formed that they are placed in a sequential order form MSB (Most Significant Bit) of $dL_0$, $dR_0$ to LSB (Least Significant Bit) of $dL_{13}$, $dR_{13}$.

Figure 5:
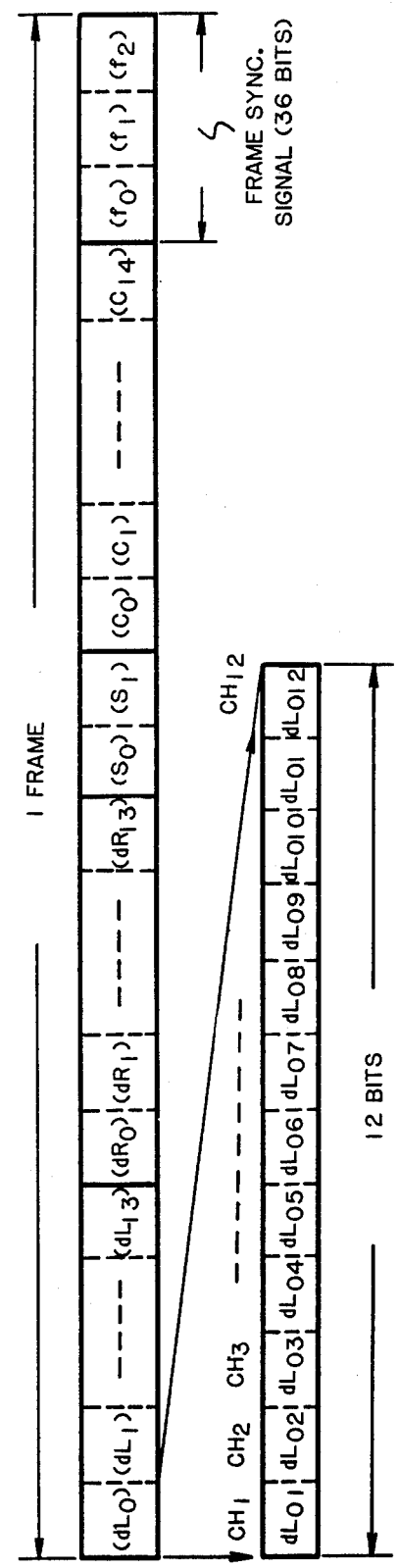

The data series of the respective broadcasting channels having the data format as shown in FIG. 4 are synchronized with each other and delivered to the multiplexer 15, by which they are time-sharing multiplexed bit by bit taking one subblock $SB_i$ as a unit. The total of 12 subblocks $SB_i$ contained in the respective broadcasting channels from CH1 to CH12 construct one frame of the transmitted data series as shown in FIG. 5.

The one frame is constructed such that a bit group $dL_0$, $dL_1$ ... $dL_{13}$ of the left channel data, a bit group $dR_0$, $dR_1$ ... $dR_{13}$ of the right channel data, service bit groups $s_0$ and $s_1$, error-correcting redundant bit groups $c_0$ to $c_{14}$ and synchronizing bit groups $f_0$, $f_1$ and $f_2$ are arranged in sequence. Each bit group is formed of 12 bits and it is a set of a plurality of bits corresponding to each other between the channels from CH1 to CH12. For example, the bit group $dL_0$ is the set from the MSB $dL_{01}$ of the data in the left channel in CH1 to the respective MSBs $dL_{02}$, $dL_{03}$ ... $dL_{012}$ of CH2, CH3 ... CH12.

The multiplexer 15 for time-sharing multiplexing the data series as described above can be realized by a shift register 22 as shown in FIG. 6. In other words, the data series of the broadcasting channels from CH1 to CH12 are supplied to 12 parallel input terminals of the shift register 22, namely, the intermediate output terminals $14_a$ to $14_l$, by which they are taken bit by bit in the shift register 22 in accordance with a load pulse applied to its terminal 23 and then produced at a serial output terminal 25 by a clock pulse CK supplied thereto through a terminal 24.

Assuming that data bits of the channels from CH1 to CH12 synchronized one other as shown in FIG. 7A are supplied to the parallel input terminals $14_a$ to $14_l$ of the shift register 22, a load pulse seen in FIG. 7B is produced in a timing nearly central of the bit cell, so that the MSBs, for example, from CH1 to CH12 are loaded to the shift register 22 one at a time at the downward-going edge of the load pulse. Then, as shown in FIG. 7C, the data bits are taken out at the output terminal 25 of the shift register 22 by the clock pulse CK having a period of 1/12 of bit period of the data. Therefore, the output data series become such one that the bit groups $dL_0$, $dL_1$ ..., are sequentially connected to one other as shown in FIG. 7D.

Turning back to FIG. 3, the data series that has been time-sharing multiplexed as described above is supplied from the multiplexer 15 to a PSK (Phase Shift Keying)

modulating circuit or modulator 16. In this embodiment, a four-phase PSK modulation is utilized in the PSK modulator 16 in which a carrier of 113 $MH_Z$ is modulated by transmitting data with a transmitting rate of 18.432 Mb/sec. The four-phase PSK modulation is to phase-modulate the data series such that the phase of the carrier is made different by each $\pi/4$ in accordance with the bit pattern (four ways may be possible as 00, 01, 10 and 11) of 2 bits with respect to the data bit. The output from the PSK modulator 16 is supplied to and frequency-converted to a signal with a carrier frequency of about 14 $GH_Z$ by frequency converters 17 and 19. Reference numeral 18 denotes a microwave transmitting line such as a coaxial cable connected between the frequency converters 17 and 19. The output signal derived from the frequency converter 19 is fed to and amplified by a microwave amplifier 20 whereby it is produced at an output terminal 21 and hence transmitted from the transmitting antenna 1A (refer to FIG. 1).

The artificial satellite 2 receives and amplifies this transmitted signal thereby permitting it to be frequency-converted to a signal with a carrier frequency of about 12 $GH_Z$ and then transmitted to a number of receivers on the earth.

FIG. 8 schematically shows a construction of the receiving apparatus 6 provided at each listener or receiving station 3 (refer to FIG. 1) in which the received signal through the receiving antenna 3A (in FIG. 1) is supplied to an input terminal 26 and then delivered by way of a microwave amplifier 27, a frequency converter 28 and a coaxial cable 29 to a frequency converter 30 so as to be recovered to the signal having the carrier frequency of 113 $MH_Z$ and PSK-converted. This signal is delivered to and demodulated by a PSK demodulator 31. The carrier used in such demodulation is formed of the received signal employing a PLL (Phase Locked Loop) circuit. The demodulated output derived from the PSK demodulator 31 is fed to a synchronous separating circuit or separator 32 and then delivered to a channel selector 33 whereby only the data series of a desired channel from CH1 to CH12 is selected. The received data series of the specific broadcasting channel selected from the channel selector 33 is supplied to an error correcting and error-concealing circuit 34. This received data series has the same data format as that in the transmitting side as shown in FIG. 4 and is corrected for error in each one subblock. In this case, when detected error is beyond the error-correcting capability of the code, the error-concealment is performed to conceal the error. The error-corrected or error-concealed signal is delivered from the error-correcting and error-concealing circuit 34 to a D/A converter 35 so as to be returned to an audio signal, then it is separated into the right and left stereo channels of the stereo by an analog switch 36 and then supplied through low pass filters 37L and 37R to audio output terminals 38L and 38R. These separated stereophonic audio signals are supplied through an amplifier of the Hi-Fi apparatus 7 (FIG. 2) to two speakers so that the listener can reproduce them in the stereophonic mode.

To perform various data processings at the receiving side as mentioned above, the frame synchronizing signals $f_0$, $f_1$ and $f_2$ which were separated by the synchronous separating circuit 32 are used.

The channel selector 33 can be achieved by using a shift register 39 and a latch circuit 40 as illustrated in FIG. 9. In detail, the received data series is supplied to an input terminal 41 of the shift register 39 and then taken thereinto by a clock pulse supplied thereto through a terminal 42. The shift register 39 is of 12-bit type and in a certain timing, stores 12 bits of $dL_{01}$ to $dL_{012}$ contained in the bit group $dL_0$. The output of 12 bits from this shift register 39 are supplied to the latch circuit 40, wherein each bit group consisting of the bits corresponding to one another from CH1 to CH12 as mentioned above is taken into the latch circuit 40 by a latch pulse supplied thereto through a terminal 43. The latch pulse has a bit period at the stages before the signals from the respective broadcasting channels are time-sharing multiplexed and owing to this latch pulse, the output of 12 bits from the latch circuit 40 are introduced into twelve input terminals of a selector 44. The selector 44 serves to set a connecting position of the channel in response to the broadcasting station which the listener desires to receive. FIG. 9 indicates a case where the channel CH2 is selected and therefore the received data series of CH2 is produced at an output terminal 45 of this selector 44.

In the PCM broadcasting using the broadcasting satellite and so on as described above, the code error occurs as a form of a random error. It is important that the code error is corrected and concealed with good efficiency in a PCM broadcasting of high quality. Thus, if the error-correction and error-concealment capability is strengthened, it is expected that a degradation of a C/N (Carrier to Noise) ratio in the received signal may be improved and a service area may be widened.

In a conventional communication circuit, a convolutional code is widely employed mainly in view of easy decoding. But, in the presence of input noise beyond the error-correction capability, the convolutional code inherits a problem that the error is transmitted to the following code due to the input noise and hence the convolutional code is not suitable for a PCM broadcasting of high quality.

To avoid this the present invention provides a system wherein some words are prepared to comprise one block and the error-correcting code is generated based on such block unit.

Figure 10:
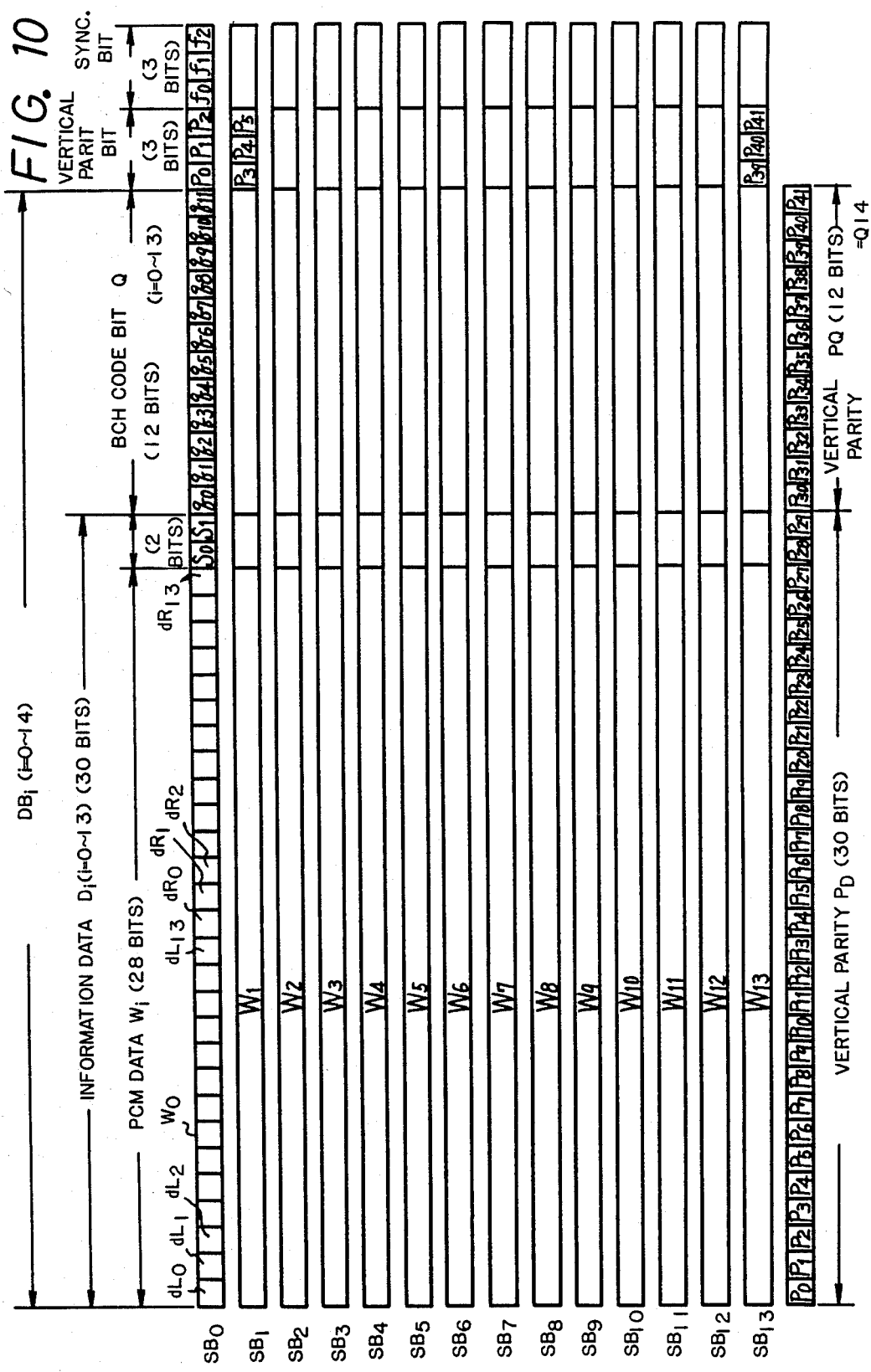
FIG. 10 is a schematic diagram showing an error correction block format of an error correction method used in the present invention.

A practical example of the error-detecting and correcting code according to the present invention will be described hereinafter. The error-detecting and -correcting code is comprised as shown in FIG. 10. In this example, PCM data $W_i$ totalling 28 bits consists of stereophonic audio signals of the right and left channels each formed of 14 bits per one sample at every one channel and including 2 service bits will form an information data $D_i$ of a total of 30 bits. This information data $D_i$ is arranged in rows, and 14 rows of this information data $D_i$ are arranged as $D_0$ to $D_{13}$ so that when also viewed in the column direction thereby forms a matrix $30 \times 14$. Parity $Q_0$ to $Q_{13}$ of double error correcting BCH code (42 bits or 30 bits) each consisting of 12 bits of $q_0$ to $q_{11}$ are added to each of the row directions. Also, at the end of the column direction corresponding to the data $D_0$ to $D_{13}$ is added a vertical parity $P_D$ consisting of 30 bits formed of $p_0$ to $p_{29}$. A vertical parity $P_Q$ comprised of 12 bits formed of $p_{30}$ to $p_{41}$ relative to the parity $Q_0$ to $Q_{13}$ of the BCH code is formed likewise. This vertical parity $P_Q$ is made coincident with the parity $Q_{14}$ of the BCH code relative to the vertical parity $P_D$. In other words, the parity $Q_i$ of the BCH code, if an encode matrix is taken as $H_E$, is expressed as follows:

$$Q_i = H_E \cdot D_i$$

The vertical parity $P_Q$ corresponding to the parity $Q_i$ in the BCH code is $$P_Q = \sum_{i=0}^{13} Q_i = H_E \sum_{i=0}^{13} D_i = H_E \cdot P_D = Q_{14}$$

When the BCH code $Q_i$ and the vertical parity codes $P_D$ and $P_Q$ thus generated are transmitted by the aforesaid transmitting system, the error-correcting redundant bits $c_0$ to $c_{11}$ in the error-correcting redundant bits $c_0$ to $c_{14}$ (shown in FIG. 4) are assigned to the BCH code $Q_i$ and the remaining 3 bits from $c_{12}$ to $c_{14}$ are sequentially assigned to 42 bits from $p_0$ to $p_{41}$ consisting the vertical parity codes $P_D$ and $P_Q$ covering the area of 42 bits which are comprised of 14 blocks totally.

Next, one example of the method for decoding the codes with the arrangement as set forth above will be described hereinafter.

At first, the error-detection and -correction for the code in the row direction is performed using the parity in the BCH code. In this case, a parity check matrix $H_D$ utilizes the following one.

$$H_D = \begin{bmatrix} \alpha^0 \alpha^1 \alpha^2 \ldots \alpha^{41} \\ \alpha^0 \alpha^3 \alpha^6 \ldots \alpha^{123} \end{bmatrix}$$

where $\alpha$ represents a root of (generating polynominal $G(x)=x^6+x+1$). Employing this parity check matrix $H_D$ from the data and the BCH parity $(D_0, Q_0)$ on the first row to the vertical parity data and the BCH parity $(P_D, Q_{14})$ on the 15th row are subjected to the error-detection and -correction. If these respective 42 bits of $D_0, Q_0 \ldots P_D, Q_{14}$ are taken as data blocks $DB_0 \ldots DB_{14}$, syndromes $S_{1i}$ and $S_{2i}$ with respect to ith data block $DB_i$ are searched by $$\begin{bmatrix} S_{1i} \\ S_{2i} \end{bmatrix} = H_D \cdot DB_i^T \ (T \text{ denotes a transposed matrix})$$

By the syndromes $S_{1i}$ and $S_{2i}$, the error is detected from each data and the errors of 1 bit and 2 bits are also corrected. In this case, even if the error correction is possible, when the syndromes $S_{1i}$ and $S_{2i}$ are not zero, the error pointer of, for example, 1 bit is added to the data block $DB_i$. This error pointer is necessary to prevent an erroneous error correction which could be caused by the presence of an error of more than 3 bits.

The error-detection and -correction based upon the vertical parity will be carried out next.

The error detection and error correction are performed by using syndromes $S_{P1}$ and $S_{P2}$ which are obtained from the following calculations $$D_0 \oplus D_1 \oplus D_2 \oplus \ldots \oplus D_{13} \oplus P_D = S_{P1}$$

$$Q_0 \oplus Q_1 \oplus Q_2 \oplus \ldots \oplus Q_{13} \oplus P_Q = S_{P2}$$

When $S_{P1}=S_{P2}=0$, it is regarded that no error exists, irrespective of the presence or absence of the error pointer.

When the error syndrome $S_{P1}$ or $S_{P2}$ is not zero and where there is one error pointer, the correct data is obtained by using the error syndrome $S_{P1}$ and then the correct data is used instead of the data in which the error pointer is added thereto.

When the error syndrome $S_{P1}$ or $S_{P2}$ is not zero and when there are more than two error pointers, the data to which the error pointers are added are interpolated. As the method for interpolating the data, it is proposed that the mean value located before and after the correct data in the original time series is used as the interpolation data.

When the error pointer is zero although the error syndrome $S_{P1}$ or $S_{P2}$ is not zero, all the data from $D_0$ to $D_{13}$ are interpolated considering that the error detection based upon the BCH code is missed.

According to this method, as described above, since the vertical parity check including the parity of the BCH code is performed and when the error syndrome based upon the vertical parity check is 0, it is regarded that no error exists. In the other cases, since the error correction or the interpolation is carried out, it is possible to prevent the erroneous correction and the error detection from being missed due to the BCH code.

As another error-correcting method which can be employed in the present invention, for example, an SEC-DED (Single Error Correcting-Double Error Detecting) code may be considered.

As its name implies, this SEC-DED code is used to correct 1 bit code error and to detect 2 bits code error.

But, the SEC-DED code alone can not cope with the code error of more than 3 bits, which could give rise to the erroneous correction.

Therefore, a method is proposed in which error-detecting pointer is added to this SEC-DED code to thereby detect the erroneous correction and so forth and if necessary, to perform the interpolation therefor. In this case, owing to the necessity that the redundancy of the code has to be made small, it is requested that a cyclic redundancy check code (hereinafter, simply referred to as CRCC), which will form an error detecting pointer, is dispersed into each subblock (each word) to detect the error in a block unit. The larger this block becomes, the less the redundancy of the code decreases.

However, when the erroneous correction or the like is detected by the detecting pointer so as to perform the interpolation, the interpolation error becomes greater if the block unit is made larger.

To cope with the above aspect, in accordance with the error-correcting method which will be described in detail hereinafter, while the redundancy of the error correcting and detecting code is made small, the error correcting ratio and the interpolation error can be suppressed as small.

Figure 11:
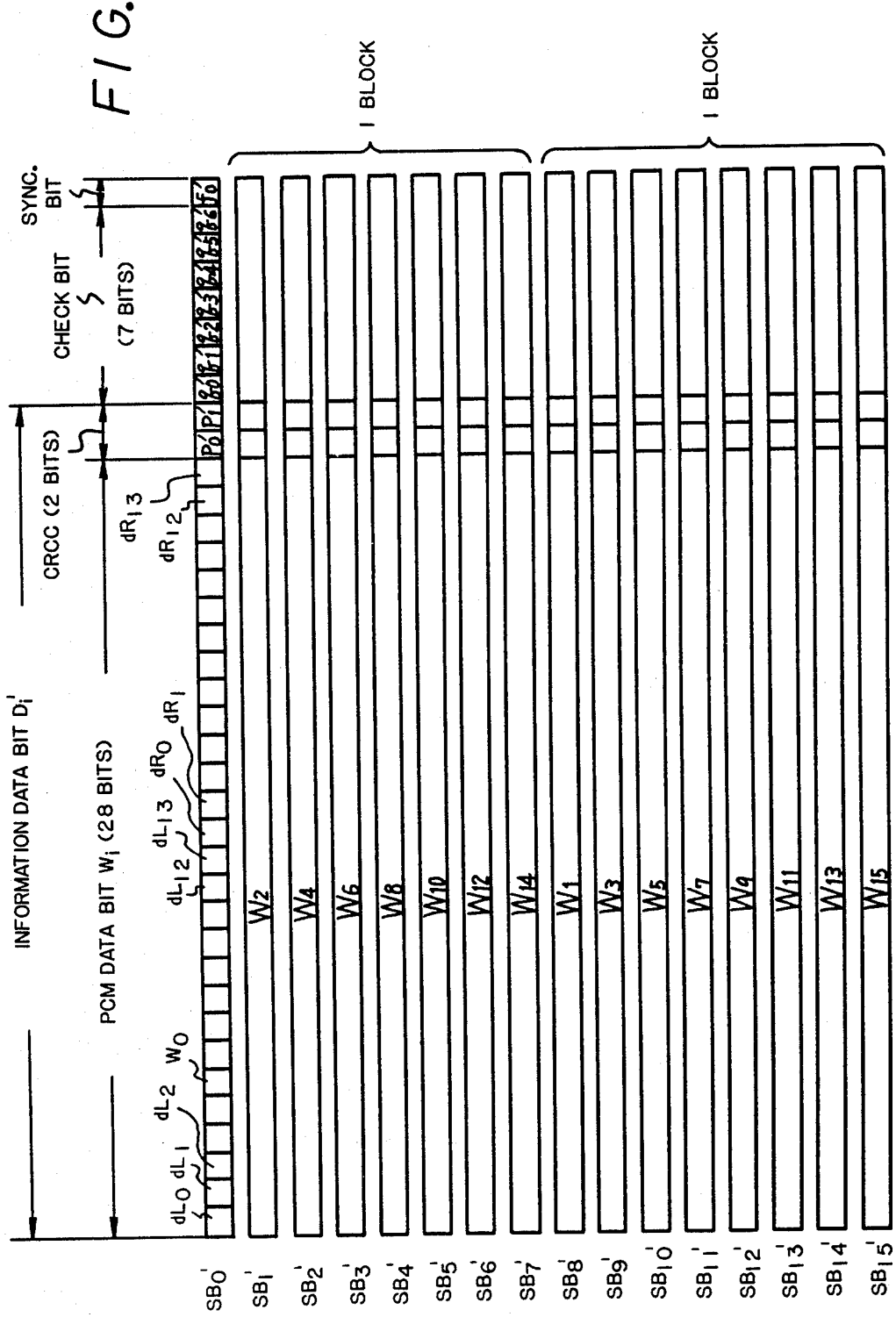
FIG. 11 is a schematic diagram showing an error correction block format of another error correction method in the present invention.

The encoding method will be described first. The error-correcting encoders $12_a$ to $12_l$ (hereinafter, represented generally as 12) at the transmitting in station 1 in FIG. 3 are provided to encode the respective inputted data series as illustrated in FIG. 11. In this case, the number of the block, the bit length of one block and so on are different from those of the previous example in FIG. 10.

In other words, a subblock $SB'_i$ (i=0, 1, 2, ..., 15) is corresponding to the subblock $SB_i$ shown in FIG. 4 and consists of PCM data $W_i$ formed of data bits $dL_0$ to $dL_{13}$ of 14 bits length in the left channel and data bits $dR_0$ to $dR_{13}$ of 14 bits length in the right channel, CRCC bits $p'_0$ and $p'_1$ of 2 bits length, detecting bits $q'_0$ to $q'_6$ of 7 bits length and synchronizing bit $f'_0$ of 1 bit length to make 38 bits totally. In this case, the service bit is omitted. The PCM data $W_i$ comprising these respective subblocks $SB'_i$ is interleaved in odd- and -even-numbered manner. That is, odd-numbered PCM data $W_0$, $W_2, \ldots W_{14}$ compose one block and even-numbered PCM data $W_1, W_3, \ldots, W_{15}$ compose another block. In this case, the CRCC of 16 bits generated from each block forms the block pointer in each block. Then, on the basis of this CRCC, it can be detected whether or not the code error exists in each block. This CRCC of 16 bits is assigned to $p'_0$ and $p'_1$ of each subblock $SB'_i$ 2 bits by 2 bits.

The check bits $q'_0, q'_1 \ldots, q'_6$ are added to the PCM data $W'_i$ formed of the data sub-block of 28 bits in length and the CRCC of 2 bits length to thereby SEC-DED encode the same.

The encoder 12 can be constructed as, for example, shown in FIG. 12. In FIG. 12, a RAM (Random Access Memory) 45 is provided to perform a block interleave. The PCM data $W_0$ to $W_{15}$ transferred from the adder 11 including the adders 11a to 11l (FIG. 3) through a terminal 46 to the encoder 12 are written in this RAM 45 and thereafter, the PCM data $W_0, W_2, \ldots, W_{14}, W_1, W_3, \ldots, W_{15}$ are sequentially read out therefrom.

On the other hand, the PCM data $W_0$ to $W_{15}$ delivered through the terminal 46 are also supplied to CRCC generating circuits or generators 47 and 48. The one CRCC generator 47 is used to generate the CRCC bit composing the block pointer in the block formed of the odd-numbered PCM data $W_0, W_2 \ldots, W_{14}$ and the other CRCC generator 48 is to generate the CRCC bit composing the block pointer at the block formed of the even-numbered PCM data $W_1, W_3, \ldots, W_{15}$. The CRCC bits generated from these CRCC generators 47 and 48 are respectively supplied through shift registers 49, 50 and gate circuits 51, 52 to an OR circuit 53 whereby the CRCC codes are added 2 bits length by 2 bits length to the PCM data $W_0, W_2, \ldots, W_{14}$ derived from the RAM 45.

The data series formed as described above is supplied to a check bit generating circuit or generator 54 wherein the check bit of 7 bits length and the synchronizing bit of 1 bit length are added to each subblock $SB'_i$. In other words, in accordance with the check bit generator 54, the data series from the OR circuit 53 is fed to a shift register 55 as a serial input. While the serial output from this shift register 55 is delivered to an OR circuit 56, the output of 1 bit is, at the same time, supplied from the input side of the shift register 55 to one of each of input terminals of 7 AND circuits 57. On the other hand, data responsive to the parity generating matrix $H_E$ was already written in a ROM (Read Only Memory) 58. This data is supplied to and serial-to-parallel-converted sequentially in 7 bits each by a shift register 59, and then it is supplied through a latch circuit 60 to the other input terminals of the AND circuits 57.

In this case, the AND circuits 57 are employed to form the check bits in association with 7 exclusive OR circuits 61 and seven D flip-flops 62. In other words, if the parity generating matrix $H_E$ is taken as $$H_E = \begin{bmatrix} h_{11} & h_{12} & \ldots & h_{130} \\ h_{21} & \cdot & \cdot & \cdot \\ \cdot & & & \cdot \\ \cdot & & & \cdot \\ h_{71} & \ldots & & h_{730} \end{bmatrix}$$

the check bits responsive to the data bits based upon the parity generating matrix $H_E$ are generated. In this case, it is general that taking the data bits and the check bits respectively as $a_0, \ldots, a_k$ and $q'_0, \ldots, q'_m$ and also taking a code V as $a_0 \ldots a_k, q'_1 \ldots q'_m$, the check bits $q'_0, \ldots, q'_m$ are decided to establish $H_E \cdot V^T = [q'_0, \ldots q'_m]^T$ In this example, $$q'_{l-1} = h_{l1} dL_0 + h_{l2} dL_1 + \ldots + h_{l30} P_1$$

is established where $l = 1, 2, \ldots, 7$. Accordingly, the AND circuits 57 produce $h_{l1} dL_0, h_{l2} dL_1, \ldots$ sequentially, which are added in series at the exclusive OR circuits 61 and the D flip-flops 62.

The check bits thus achieved are supplied to and parallel-to-serial-converted at a shift register 63 and then supplied to the OR circuit 56. As a result, in the respective subblocks $SB'_i$, the check word of 7 bits length is added to the left channel data word of 14 bits length, the right channel data word of the same 14 bits length and the CRCC word of 2 bits length, which are then delivered through a terminal 64 to the synchronizing adding circuit 13 including the circuits $13_a$ to $13_l$ located at the later stages (refer to FIG. 3) whereby they are added with the synchronizing bits of 1 bit length to comprise the code word V of 38 bits length.

The error correcting and error concealing circuit or the decoder 34 in FIG. 8 can be constructed as, for example, seen in FIG. 13.

Reference numeral 65 denotes a decoding circuit 65 which will detect the erroneous correction of a code word V' (sometimes, there may be code error) transmitted through the transmitting system such as an antenna and fed to input terminal 66 and 67 of the decoder 65 to thereby produce the data bit from output terminals 68 of the decoder 65, thereafter.

In FIG. 13, the data of 30 bits length composing the right and left channels data words of 14 bits lengths and the CRCC word of 2 bits length is supplied from the input terminal 66 to the decoding circuit 65 of the SEC-DED code and the check word of 7 bits length is supplied from the input terminal 67 thereto. In this decoding circuit 65, the PCM data $W_i$ and the CRCC bits $p'_0$ and $p'_1$ are applied to adders 69. The respective data words of 14 bits each are also supplied to a syndrome generating circuit 70. The syndrome generating circuit 70 is also supplied with the check words $q'_0$ to $q'_6$ of 7 bits length. In this case, the syndrome generating circuit 70 is used to perform the calculation of $H_{D'}(V')^T = S^T$ to generate a syndrome S where $H_D$ is as follows:

$$H_D = \begin{bmatrix} h_{11} & h_{12} & \ldots & h_{130} & 1 & 0 & \ldots & 0 \\ h_{21} & \cdot & \cdot & \cdot & & & & \cdot \\ \cdot & & & \cdot & & & & \cdot \\ \cdot & & & \cdot & & & & \cdot \\ \cdot & & & \cdot & & & & \cdot \\ h_{71} & \ldots & & h_{730} & 0 & \ldots & & 01 \end{bmatrix}$$

Then, if an erroneous pattern E is expressed by taking an erroneous place as "1" and others as "0", thus $S^T$ is expressed as follows:

$$S^T = H_{D'}(V')^T = H_{D'}(V^T + E^T) = H_D \cdot E^T$$

Accordingly, the syndrome S is decided by the pattern E alone and hence the erroneous position can be identified or discriminated based on the syndrome S. A syndrome decoder 71 carries out such discrimination and produces the output "1" at its position responsive to the erroneous position.

The syndrome S generated at the syndrome generating circuit 70 is supplied to an OR circuit 72, a 1 bit error detecting circuit or detector 73 and a 2 bits error detecting circuit or detector 74. The OR circuit 72 is adapted to produce an error detecting output $E_0$ and the 1 bit and 2 bits error detectors 73 and 74 are also adapted to produce 1 bit error detecting output $E_1$ and 2 bits error detecting output $E_2$, respectively.

The 1 bit error detecting output $E_1$ is also applied to the AND circuits 75 wherein the output "1" is supplied to either of the adders 69 responsive to the erroneous position to correct the error in case of 1 bit code error.

As described above, according to the SEC-DED code, one bit error code can be corrected and two bits code error can be detected. The decoding circuit 65 produces the right and left channels data of 28 bits properly corrected and the CRCC word of 2 bits length and of which, the right and left channels data of 28 bits are supplied to a transmitting interpolation circuit 76.

On the other hand, the CRCC word of 2 bits is supplied to a CRCC decoder 77 together with the error detecting output $E_0$, the 1 bit error detecting output $E_1$ and the 2 bits error detecting output $E_2$. In this case, the CRCC decoder 77 is operated as illustrated in FIG. 14 for its output to control the transmitting interpolation circuit 77. More specifically, when there are neither of the 1 bit code error correction nor the 2 bits code error detection and the block pointer based upon the CRCC (no error in block unit exists), the decoded data is transferred as it is. In this case, since the block pointer based upon the CRCC is not raised, a probability is quite high that the errorless or correct transmission of data is performed.

When 1 bit code error correction is carried out once or a plurality of times and when the block pointer is not raised, the decoded data is transferred as it is. In this case, since the block pointer is not raised, it is an extremely high probability that the error correction performed in the decoding circuit 65 is accurate. In other words, the error correction ratio is less.

When there is one or plurality of bit code errors and when the block pointer is raised, the subblock where the error code correction is carried out is interpolated. In this case, 3 bits code error or the like but not 1 bit code error is caused in fact and such code error is erroneously corrected since the decoding circuit 65 is mainly aimed for the SEC-DED code. Such erroneous correction can be avoided by interpolating the captioned subblock. In addition, since the subblock correcponding thereto is interpolated alone, the interpolation error is reduced greatly.

When 1 bit code error correction exists once or a plurality of times and 2 bits code error detection exists once or a plurality of times and also the block pointer is raised, the subblock where the error is corrected and detected is interpolated. In this case, since it is not apparent whether or not 1 bit code correction is correct, not only the subblock where 2 bits code error is detected but also the subblock where 1 bit code error correction exists are interpolated. Accordingly, the erroneous correction will never occur. In addition, the subblock responsive thereto alone is interpolated, so that there is little interpolation error in this case.

When 2 bits code error is detected once or a plurality of times and when the block pointer is raised, the subblock where 2 bits code error is detected is interpolated. In this case, since the error detection is positively or reliably carried out and only the corresponding subblock is interpolated, the interpolation error is less.

Further, when neither 1 bit code error is corrected nor 2 bits code error is detected but when the block pointer is raised, all the blocks are interpolated. In this case, since it is unclear which subblock has the code error, the entire block is interpolated. If so, it is needless to say that the interpolation error is urged to become large. But, owing to the small probability that such case will occur, it can be said that the interpolation error is small as a whole.

In accordance with the arrangement thus discussed, fundamentally speaking, 1 bit code error is corrected in each subblock by employing the SEC-DED code and also 2 bits code error is interpolated. Thereafter, the code error of the block unit is detected by the CRCC. Then, such a case where there is an error in 1 bit code error correction and the code error more than 3 bits which can not be detected can be detected in the block unit. In addition, when the information of the position where 1 bit code error correction exists, 2 bits code error detection appears and so on can be acquired, only the subblock responsive thereto is interpolated. On the other hand, in the case that the information of the position where the code error exists can not be obtained, all the blocks are interpolated to exclude the code error at the sacrifice of the fact that the interpolation error becomes more or less large. Therefore, the interpolation error becomes small as possible and the error correction ratio becomes also small.

Further, since as the redundant bit, the CRCC word is dispersed 2 bits by 2 bits in each subblock to be added thereto, the redundancy degree becomes quite small.

Also, in this example of the present invention, the block interleave is performed so that it is possible to cope with the burst error. Further, in accordance with this example, since the corresponding bits between the channels are grouped to form the bit groups and the data series are time-sharing multiplexed in such a manner as to form one frame where these bit groups are sequentially connected, the error in the received data on the desired channel can be corrected with the bit rate sufficiently lower than that upon the transmission. Therefore, the receiving apparatus can be realized at a low cost.

Also, since the bit pattern in the bit group of the synchronizing redundant bit is used as the frame synchronizing signal of the transmitting data series, even if the bit number of the synchronizing redundant bit is less, it is possible to secure the bit number necessary for the frame synchronizing signal.

While in the aforesaid embodiment, the data format of the code word is such one that the data is block-interleaved as shown in FIG. 11, it can be easily understood that the block interleave may not be applied thereto. But, instead, it is also be possible that 16 subblocks of the PCM data $W_0$ to $W_{15}$ might comprise one block and the CRCC word might be assigned bit by bit to each subblock. In such case, the redundancy degree of the CRCC bit becomes one-half so that the service bit (1 word length) can be added thereto by the remaining one-half amount.

As described above, according to this decoding apparatus, after the error correction and detection of the respective subblocks are carried out based upon the check bits, the errors are detected in the block unit based on the CRCC after the error correction and detection. Accordingly, if the erroneous correction exists within the block, such erroneous correction can be positively or reliably detected based upon the CRCC.

Thus, if the interpolation is performed based upon such detection, the erroneous correction ratio is greatly reduced. In addition, since the CRCC is dispersed into the respective subblocks, the redundancy degree of the code can be made extremely small.

Further, in accordance with the decoding apparatus of this example, when the error correction and detection exist in any one of the subblocks and at the same time, the error is detected in the block unit, the subblock where the error was corrected and detected is interpolated. Thus, the interpolation error is decreased greatly as compared with the previous case where all the blocks are interpolated. In addition, since the subblock in which the error is corrected and detected is interpolated, if the erroneous correction is carried out, such erroneous correction can be solved by the interpolation.

Also, since the erroneous detections in the block unit are caused almost all by the erroneous code within the subblock where the error is corrected and detected, the probability is quite low that the error detection will be caused by the erroneous code which is missed from the error correction and detection. Therefore, if so, it will hardly occur that the data containing the erroneous code may be transmitted without being interpolated.

On the other hand, when no error is corrected and detected at any of all the subblocks but the error is detected in the block unit, the entire block is interpolated. In this case, since it can not be discriminated which subblock has the code error, all the blocks are interpolated to prevent the data with the erroneous code from being transmitted, if it is not interpolated. If all the blocks are interpolated, it is naturally considered that the interpolation error becomes large. But, such case is very rare so that the interpolation error can be reduced on the whole.

As it is understood from the description of the embodiments mentioned above, according to the method for transmitting time-sharing multidata of the present invention, since the error detecting or error correcting redundant bit is added to every transmitting channel, each bit responsive to one another between the channels is grouped into one group to form a bit group and the data is time-sharing multiplexed in such manner as to form one frame where bit group is connected in sequence, in the receiving side, the received data of the desired channel can be error-corrected with the bit rate sufficiently lower than that upon the transmission. Consequently, the receiving apparatus can be produced at a low cost.

Also, since the bit pattern of the bit group composing the synchronizing redundant word is employed as the frame synchronizing signal of the transmitting data series, even if the bit number of the synchronizing redundant word is less, the bit number required for the frame synchronizing signal can be secured.

In this case, the data format of the data series to be supplied to the multiplexer 15 in FIG. 3 which is used to time-sharing multiplex the data series is not limited to that in FIG. 2. But instead, if such format is made the same in all the transmitting channels, any given one may be used.

The above description is given on preferred embodiments of the present invention, but it will be apparent that many modifications and variations could be effected by one skilled in the art without departing from the spirit or scope of the novel concepts of the invention, so that the scope of the invention should be determined by the appended claims only.

We claim as our invention:

1. A method for transmitting time-sharing multidata in which the data series of a plurality of channels are time-sharing multiplexed to form a transmitting data series, said method for transmitting time-sharing multidata comprising the steps of:
   generating error detecting or error correcting redundant bits from a predetermined number of information bits contained in the respective data series of each of said plurality of channels and adding said error detecting or error correcting redundant bits to the respective information bits of each of said plurality of channels to form a corresponding plurality of data sub-blocks for transmitting;
   rearranging the bits forming said sub-blocks into a first plurality of bit groups, in which each bit group therein is formed of the corresponding information bits of each of said plurality of channels, and a second plurality of bit groups, in which each bit group thereof is formed of the corresponding bits of said error detecting or error correcting redundant bits of each of said plurality of channels;
   time-sharing multiplexing said first and second pluralities of bit groups so as to form one frame in which said bit groups are sequentially continued to each other; and
   transmitting the time-sharing multiplexed frame together with a frame synchronizing signal.

2. A method for transmitting time-sharing multidata according to claim 1, wherein such a code arrangement in which an information bit of $k_1$ bits is arranged in a row direction and the information bit series is arranged in $k_2$ bit column direction to form an information bit of $(k_1 \times k_2)$ matrix and a vertical parity bit relative to the $k_2$ bit in said column direction and a parity bit based upon a BCH code relative to the respective $k_1$ bit of said row direction and said vertical parity bit are added to the information bit of $(k_1 \times k_2)$ matrix and which can perform an error detection and error correction is used as said error correcting redundant bits.

3. A method for transmitting time-sharing multidata according to claim 2, wherein as a decoding of said code which can detect and correct the error, a method for performing the error detection and correction process based upon said BCH code, and the error detection and correction process based upon said vertical parity bit is employed.

4. A method for transmitting time-sharing multidata according to claim 1, wherein for said error correcting redundant bits, a code in which a first redundant bit obtained by dividing a cyclic redundancy check code forming a block pointer and a second redundant bit generated from a parity check matrix to said subblocks each are respectively added to data bits obtained by dividing data of block unit into a plurality of subblocks is used.

5. A method for transmitting time-sharing multidata according to claim 4, wherein said decoding of the error detecting and correcting code is comprised of the steps of performing the respective error correcting and detecting of said subblocks based upon said second redundant bit, detecting and correcting the error of said block unit based upon said cyclic redundancy check code, interpolating the subblock where the error detection and correction exist when any one of said subblocks has the error to be corrected and detected and at the same time, when the error in said block unit is detected and interpolating all the blocks when none of said subblocks has error correction and detection and when an error in said block unit is detected.

6. A receiving method for receiving the data transmitted according to the method for transmitting time-sharing multidata in claim 1, said receiving method comprising the steps of extracting data only on a desired channel from time-sharing data containing a plurality of received data channels with a clock of a predetermined period and error-correcting said desired data.

7. A method for transmitting time-sharing multidata in which the data series of a plurality of channels are time-sharing multiplexed to form a transmitting data series, said method for transmitting time-sharing multidata comprising the steps of:
   adding error detecting or error correcting redundant bits to a predetermined number of information bits contained in the respective data series of each of said plurality of channels and forming a corresponding plurality of data sub-blocks for transmitting;
   adding synchronizing redundant bits to each of said data sub-blocks for use in synchronizing said sub-blocks;
   rearranging the bits forming said sub-blocks into a first plurality of bit groups in which each bit group therein is formed of the corresponding information bits of each of said plurality of channels and a second plurality of bit groups in which each bit group thereof is formed of the corresponding bits of said error detecting or error correcting redundant bits of each of said plurality of channels;
   time-sharing multiplexing said first and second pluralities of bit groups so as to form one frame in which said bit groups are sequentially continued to each other; and
   transmitting the time-sharing multiplexed frame together with a frame synchronizing signal.

8. A method for transmitting time-sharing multidata according to claim 7, including the further step of rearranging the bits forming said sub-blocks including said synchronizing redundant bits into a third plurality of bit groups formed of the corresponding bits of said synchronizing redundant bits of each of said plurality of channels.

9. A method for transmitting time-sharing multidata according to claim 8, in which the step of transmitting the time-sharing multiplexed frame data includes the step of utilizing said third plurality of bit groups formed of corresponding bits of said synchronizing redundant bits as said frame synchronizing signal.

* * * * *